United States Patent
Kossin

(10) Patent No.: US 9,571,317 B1
(45) Date of Patent: Feb. 14, 2017

(54) BANDWIDTH EFFICIENT CONTINUOUS PHASE MODULATION

(71) Applicant: Harris Corporation, Melbourne, FL (US)

(72) Inventor: Philip S Kossin, Clifton, NJ (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 15/002,114

(22) Filed: Jan. 20, 2016

(51) Int. Cl.
*H04L 27/18* (2006.01)
*H04L 27/20* (2006.01)

(52) U.S. Cl.
CPC .................................. *H04L 27/20* (2013.01)

(58) Field of Classification Search
CPC .. H04L 27/20; H04L 27/2003; H04L 27/2007; H04L 27/201; H04L 27/2014
See application file for complete search history.

(56) References Cited

U.S. PATENT DOCUMENTS

| | | | | |
|---|---|---|---|---|
| 4,843,352 A * | 6/1989 | Kamisaka | ........... | H04L 27/2071 332/104 |
| 5,966,055 A * | 10/1999 | Knoedl, Jr. | .......... | H03C 3/0975 332/100 |
| 6,356,580 B1 * | 3/2002 | Stephens, Sr. | ......... | H04B 1/707 375/141 |
| 7,412,008 B2 | 8/2008 | Lliev | | |
| 8,036,287 B2 * | 10/2011 | Hwang | ................. | H04L 5/0021 375/140 |
| 8,817,912 B1 * | 8/2014 | Wu | ........................ | H04L 27/206 375/308 |
| 9,240,761 B1 * | 1/2016 | Reyland, Jr. | .......... | H03F 1/0294 |

(Continued)

FOREIGN PATENT DOCUMENTS

| EP | 0871009 B1 | 10/1998 |
|---|---|---|
| EP | 0806079 A1 | 11/2003 |

(Continued)

OTHER PUBLICATIONS

Ipatov, V., B.V. Shebshaevich, "Spectrum Compact Signals: A suitable option for Future GNSS," Inside GNSS, vol. 6(1), pp. 47-53 (2011).

(Continued)

*Primary Examiner* — Khanh C Tran
(74) *Attorney, Agent, or Firm* — Edell, Shapiro & Finnan, LLC

(57) ABSTRACT

A technique for generating a phase modulated, constant envelope transmit signal having continuous phase transitions between adjacent symbols involves generating a stream of symbols having a sequence of symbol states and identifying antipodal phase transitions between adjacent symbols representing different states. The phase rotation polarity of the continuous phase transitions between adjacent symbols having antipodal phase transitions is controlled such that a phase rotation polarity pattern of the antipodal phase transitions in the stream of symbols is uncorrelated with the sequence of symbol states. The constant envelope transmit signal is then generated from the stream of symbols. The spectral profile of the constant envelope signal can be tailored by selection of the phase trajectory shape and the portion of the symbol over which the continuous phase transition occurs.

20 Claims, 12 Drawing Sheets

(56) References Cited

U.S. PATENT DOCUMENTS

| | | | | |
|---|---|---|---|---|
| 2006/0092326 A1* | 5/2006 | Tanabe | ................ | H04L 27/361 348/571 |
| 2007/0230620 A1* | 10/2007 | Poberezhskiy | ..... | H04L 27/2071 375/308 |
| 2011/0051783 A1* | 3/2011 | Cahn | ...................... | H04B 1/707 375/146 |
| 2013/0044829 A1* | 2/2013 | Dapore | ............. | H04L 25/03343 375/259 |

FOREIGN PATENT DOCUMENTS

| | | |
|---|---|---|
| EP | 1682854 B1 | 10/2014 |
| WO | 2013003636 A2 | 1/2013 |

OTHER PUBLICATIONS

Lohan E.S., et al., "Complex Double-Binary-Offset-Carrier modulation for a unitary characterization of Galileo and GPS signals," IEE Proceedings—Radar Sonar Navigation, vol. 53(5), pp. 403-408 (2006).

Rodríguez, J.A.A., "On Generalized Signal Waveforms for Satellite Navigation", Doctoral Thesis, Submitted Jun. 2008, University FAF Munich.

\* cited by examiner

BANDWIDTH EFFICIENT CONTINUOUS PHASE MODULATION

BACKGROUND

Many wireless applications utilize saturated radio RF amplifiers because of their high efficiency. Constant envelope modulations are used with saturated amplifiers because the transmitted information resides in the phase domain, which is relatively unaffected by the nonlinearity of the saturated amplifier. Minimum Shift Keying (MSK), Gaussian MSK (GMSK), and other forms of continuous phase modulation (CPM) can be applied to navigational signals to obtain reduced bandwidth while maintaining a constant envelope. For example, in MSK, a linear ramp phase transition is used instead of an instantaneous phase transition.

Two conventional phase shift keying cases to consider are: binary antipodal schemes, e.g., Binary Phase Shift Keying (BPSK); and M-ary PSK. With BPSK, if a single pseudo-noise (PN) code is to be transmitted on a single quadrature channel, then a binary form of MSK can be used to transmit the code. In this case, two phases that are 180° apart (i.e., "antipodal" phase states) can be used to respectively represent the binary signal states. When using continuous phase transitions between symbols instead of instantaneous phase transitions, there are two equivalent phase trajectory option available to perform the 180° phase transition between the two antipodal phases: proceed in the counterclockwise direction for a total phase change of 180° (a positive phase shift ramp); or proceed in the clockwise direction for a total phase change of −180° (a negative phase shift ramp).

These two options are illustrated in FIG. 1 for the case where the current symbol is a logical '1' at a phase of 0° and the next symbol is a logical '0' at a phase of 180°. Note that an instantaneous phase change would proceed directly back and forth along the I-axis in the example shown in FIG. 1 (i.e., there is no rotational polarity); thus, the issue of phase rotation polarity exists in the context of phase modulated signals that employ continuous phase transitions between adjacent symbols. Either rotational polarity will result in the same end phases and both are identical in terms of the PN code and the CPM. Thus, the continuous phase modulation leaves an ambiguity with respect to the polarity of the phase ramps when transitioning between antipodal phase states.

A CPM BPSK phase trajectory with a fixed, positive phase transition rotational polarity is illustrated in FIG. 2. In this case, the symbol vector proceeds with a counterclockwise phase rotation around the unit circle for all phase transitions, i.e., from a logical '1' at 0° to a logical '0' at 180° and from a logical '0' at 180° to a logical '1' at 0°.

Alternating phase transition rotational polarity per transition is shown in FIG. 3. In this case, the symbol vector rotates back and forth from a logical '1' at 0° to a logical '0' at 180°. That is, a counterclockwise (positive) phase rotation is used to transition from the '1' phase state to the '0' phase state, while a clockwise (negative) phase rotation is used to transition from the '0' phase state to the '1' phase state. Note that in this scheme, the phase trajectory always stays in the upper half plane (as illustrated) or, alternatively, in the lower half plane if the opposite polarity convention is used (not shown). The quadrature (Q) component of the signal will therefore always be either positive (as shown in FIG. 3) or negative (in the convention not shown) for all phase transitions.

The problem with a fixed rotation polarity such as that shown in FIG. 2 is that, if the same direction of rotation is used for all phase transitions, there is a net frequency shift which skews the frequency spectrum of the signal. There is also spreading of the PN symbol information into the next symbol which results in a widening of the autocorrelation peak and a filling in of the side nulls. This degrades the time acquisition performance of the user receiver, which is particularly troublesome for receivers required to accurately determine the arrival time of signals, such as in the case of navigation signals. These effects are shown in FIGS. 4 and 5 for a CPM version of a BOC(10,5) (Binary Offset Carrier) waveform with a fixed phase rotation direction. Specifically, FIG. 4 illustrates the correlation function degradation of a BOC(10,5) CPM signal with a fixed phase rotation direction (solid line) relative to a conventional BOC(10,5) correlation function with instantaneous phase transitions (dashed line). FIG. 5 illustrates the power spectrum of a CPM BOC(10,5) with a fixed phase rotation direction (solid line) relative to the conventional BOC(10,5) power spectrum with instantaneous phase transitions (dashed line). Note that, as expected the CPM achieves a significantly narrower spectrum than the BOC(10,5) waveform with instantaneous phase transitions. However, the fixed phase rotation of the CPM signal results in the overall spectrum being asymmetric, shifted to the right (positive frequency direction).

The problem with alternating rotation with each transition, as shown in FIG. 3, is that, since the Q component has the same polarity for all transitions, the Q component can be looked at as a stream of pulses with a fixed polarity pulse occurring during each phase transition. This generates unwanted clock spurs and also degrades the null depth of the autocorrelation function.

Thus, when conventional CPM methods (including MSK, GMSK, etc.) are used, the waveform may be bandwidth efficient but will have a distorted correlation function when detected in the user receiver. The correlations nulls that occur at integer chip spacings will not be as deep as for a conventional signal, as shown in FIG. 4. As a result of the decreased null depths, time accuracy estimates in the receiver (Early/Late) detector will be degraded. This happens because some of the energy in each navigational chip is spread into the adjacent chip so that the cross-correlation of the waveform with the reference code is no longer zero at +/−half chip offset.

Where there is PN data on both the in-phase (I) and quadrature (Q) channels, such as with quadrature PSK (QPSK) or M-ary phase constellations, CPM can also be used to maintain a constant envelope. However, the possibility of +180° or −180° phase transitions between adjacent symbols still exists. Thus, M-ary PSK schemes still present the issue of ambiguity with respect to antipodal transitions and, consequently, the same problems that occur in the antipodal case. Further, in cases where there are multiple codes such that one code is on the I channel and another code is on the Q channel, or where multiple codes are combined to form an M-ary signal constellation (e.g., Phase-Optimized Constant-Envelope Transmission (POCET), Interplex, Majority Vote, or Intervote combining methods), the same issues described above for the antipodal case will arise when there are 180° phase transitions between adjacent symbols.

Conventional MSK and GMSK are defined to have the phase transition occurring over the entire symbol interval. In the case of GMSK, the waveform is further tailored through varying the BT product where B is the Gaussian filter bandwidth and T is the symbol time. However this approach offers only a limited amount of optimization of bandwidth efficiency versus correlation loss.

In conventional CPM systems, the spectrum is controlled only by the modulation parameters. In the case of GMSK, for example, this would be the BT product. This does not always offer a system designer enough options for designing a waveform that meets desired spectral requirements.

SUMMARY

Described herein is a technique for generating a phase modulated, constant envelope transmit signal having continuous phase transitions between adjacent symbols. The technique involves generating a stream of symbols having a sequence of symbol states and identifying antipodal phase transitions between adjacent symbols representing different states. The phase rotation polarity of the continuous phase transitions between adjacent symbols having antipodal phase transitions is controlled such that a phase rotation polarity pattern of the antipodal phase transitions in the stream of symbols is uncorrelated with the sequence of symbol states. The constant envelope transmit signal is generated from the stream of symbols. By ensuring that the phase rotation polarity pattern is uncorrelated with the sequence of symbol states, the autocorrelation function of the signal at a receiver maintains deep nulls like those of a signal with instantaneous phase transitions while benefiting from the more efficient spectral bandwidth typically associated with continuous phase modulation. The spectral profile of the constant envelope signal can be further tailored by selection of the phase trajectory shape and the portion of the symbol over which the continuous phase transition occurs. The described technique can be applied to other signal waveforms that experience antipodal phase transitions, including those with M-ary phase constellations.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

DETAILED DESCRIPTION

Figure 1:
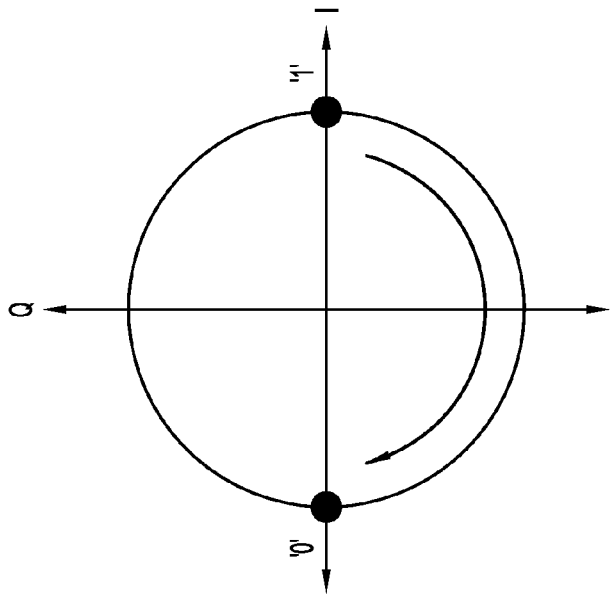
FIG. 1 illustrates two phase trajectory options (clockwise and counterclockwise) for phase rotation transitions between two symbol phases that are 180° apart in an antipodal phase modulation scheme involving continuous phase transitions.
Figure 1:
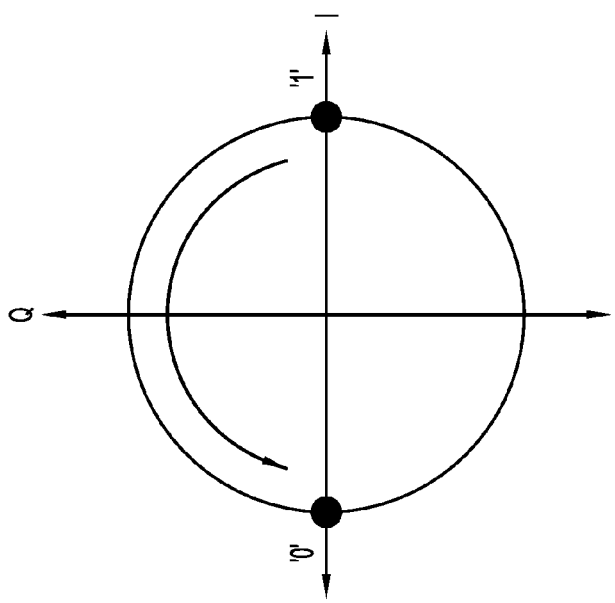
Figure 3:
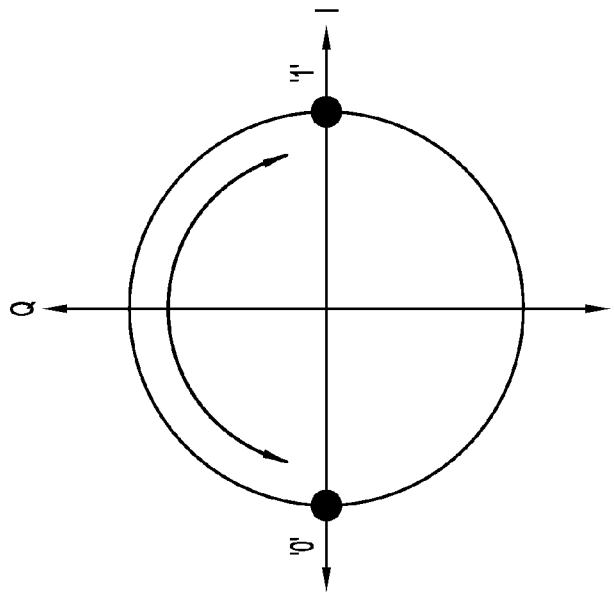
FIG. 3 illustrates an antipodal phase trajectory with an alternating phase rotation polarity for transitions between the two symbol phases.
Figure 2:
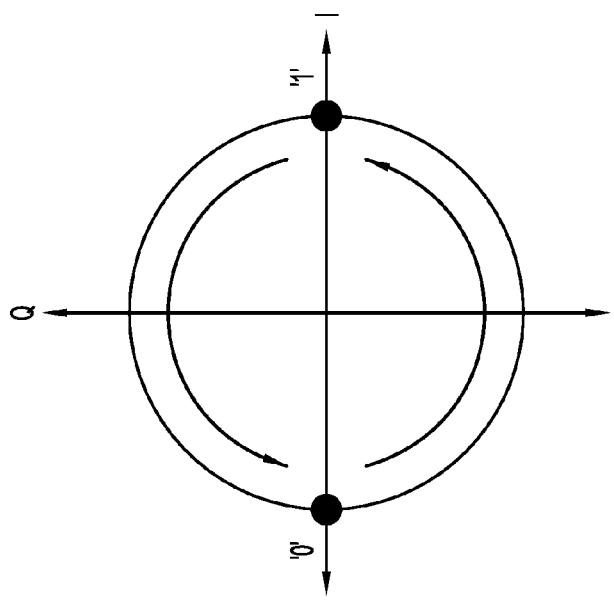
FIG. 2 illustrates an antipodal phase trajectory with a fixed, positive (counterclockwise) phase rotation polarity for all transitions between the two symbol phases.

The system described herein overcomes the aforementioned phase transition polarity problems and offers the system designer more control over the transmitted waveform. The described scheme modifies the CPM modulation phase transition rotation without increasing the null-to-null width of the central lobe or decreasing the side null depth of the autocorrelation function of the received code, which is particularly useful for navigational signals. The scheme includes not only smoothing the phase transitions for a continuous phase and constant envelope modulation, but also includes modifying the phase transitions so that when the phase transitions are cross-correlated with the reference code in the receiver, the cross-correlation output will still have the deep nulls needed for accurate time estimation that are present in the standard unmodified waveform. This result is accomplished by operating on the direction of the phase transitions with an inserted sequence which makes them uncorrelated with the sequence of symbol states (e.g., the PN code) of the transmitted signal. The direction of the phase transitions are patterned (e.g., randomized or ordered in an uncorrelated deterministic sequence) over a number of symbols, which is optionally variable, so that the phase transitions are uncorrelated with the transmitted symbol sequence. This has the effect of preserving the deep nulls in the receiver cross-correlator detector at half-chip offsets. The manner in which the pattern is applied will result in different output spectra of the transmitted signal. A large number of patterns to alternate or randomize the phase changes is possible. The parameters of the alternation/randomization pattern do not alter the correlation loss as long as they are uncorrelated from the symbol sequence (e.g., the navigational code), but they do alter the shape of the spectrum of the transmitted signal. These parameters offer the systems designer more options to shape the resulting spectrum to meet spectral requirements while meeting the correlation requirements.

In addition to the pattern of polarity alternation/randomization, there are also many different phase trajectory functions that can be used. Each phase trajectory has its own spectrum and associated correlation loss. The trajectories that have the lowest correlation loss usually have the widest spectrum, and vice versa. According to the described approach, a system designer is given the ability to choose the most optimal phase trajectory function and phase polarity pattern to fit the particular application requirements for correlation loss and spectral content. This additional capability further differentiates the described system from conventional CPM schemes such as MSK and GMSK, which have particular phase trajectory functions. For navigational codes with stringent correlation and spectral requirements, the described system generalizes the phase trajectory to an arbitrary trajectory optimized for the system hardware and signal channel.

By allowing selection of the phase rotation pattern as well as the phase trajectory function, while keeping a constant envelope, the described modulation offers the system designer a wider trade space than conventional CPM modulation techniques for producing a waveform that meets both spectral and correlation requirements of the system.

As used herein and in the claims, the term "symbol" refers to a time interval of a signal in which the phase of the signal is in a state representing some value. In the case of a spread spectrum signal in which a spreading code such as a pseudonoise (PN) code is used to spread an information signal, each "chip" of the PN code is a "symbol" within the meaning used herein (which would be distinct from a data symbol that could be represented by a sequence of such PN chips in this content).

As used herein and in the claims, the term "pattern" refers to time sequence of values in some order that can be, for example, random, pseudo-random or semi-random, based on a pseudo-noise code, fixed or predetermined, weighted towards certain values, and combinations thereof.

Uncorrelated Phase Transition Pattern

The described system achieves both desirable spectral qualities and correlation qualities by introducing a technique of patternizing the phase rotation polarity. This approach provides desirable spectral qualities, without spurs, and preserves the autocorrelation function for accurate timing, i.e., null-to-null width and side null depth is preserved.

The key to achieving sharp early-late correlator timing performance in the receiver while at the same time having linear, Gaussian, or other gracefully shaped phase trajectories is to change the polarity of the phase transitions so that they are de-correlated from the sequence of symbol values (e.g., the PN code) of the transmit signal. Many possible phase rotation patterns that avoid a significant correlation with the signal PN code are available, including randomizing the polarity of the phase rotation using a PN generator every R symbols, where R is a positive integer greater than one, which randomizes the phase rotation to preserve the autocorrelation shape. Provided below is a non-exhaustive list of examples of phase rotation patterns that can be used to obtain the desired correlation and spectral properties:

1. Define P (+) and P (−) as the probability of a positive (counterclockwise) or negative (clockwise) transition between two antipodal states, e.g., a logical '1' at 0° and a logical '0' at 180°. Since these are the only two possibilities for a continuous phase transition in an antipodal waveform, P(+)+P(−)=1. Randomly select the phase polarity (+ or −) using a PN generator, and apply the selected polarity to R consecutive transmitted symbols. The probability of a '+' transition is the same as the probability of a transition, i.e., P(+)=P(−)=0.5.

2. Alternate (toggle) the phase polarity between positive (counterclockwise) and negative (clockwise), and keep each selected polarity constant over R transmitted symbols. Note that this approach is significantly different from simply alternating between positive and negative phase rotation polarities at every transition. In a single symbol, it is possible to have two transitions, which creates the issue of having always to clock in the same direction. This issue is avoided by keeping the phase rotation polarity constant over R symbols.

3. Use a fixed binary pattern (e.g., 101001) which determines the polarity, and keep the polarity constant for R transmitted symbols for each value in the pattern. The binary pattern must be uncorrelated from the PN code (symbol sequence) of the transmitted navigational or timing sequence.

4. The same as option 1 above, but have P(+)≠P(−), so P(+) is ≠0.5. This alters the shape of the spectrum, but also degrades the correlation null depth. The user chooses the desired P(+) value to meet the requirements of the system. In other words, it may be desirable in certain context to sacrifice some quality of the correlation properties in exchange for a particular spectral profile.

5. Send R symbols using P(+)=$P_1$ and then send the next R symbols using P(+)=$P_2$ such that the mean, $$\overline{P(1) + P(2)} = 0.5$$

6. The same as option 5 above, but the mean is not be equal to 0.5 as needed.

7. Send $R_1$ symbols using P(+)=$P_1$ and $R_2$ symbols using P(+)=$P_2$ such that the weighted mean equals 0.5, ie:

$$\frac{(R_1 P_1 + R_2 P_2)}{R_1 + R_2} = 0.5$$

8. The same as option 7 above, but with a weighted mean not equal to 0.5 as needed.

9. Vary the probability P(+) using a time-varying probability function over the entire waveform using a periodic function such as sine or cosine such that the average probability P(+)=P(−)=0.5. The period T of the function would be a variable that the operator can select to obtain the desired spectral qualities. In general, T>>$T_{symbol}$ so that the period contains a large number of symbols.

10. The same as option 9 above, but using a periodic sawtooth for the time-varying probability.

11. The same as option 10 above, but using a triangular time-varying probability.

12. Use a complex time varying sequence using a combination of randomized phases and patterns.

It will be appreciated that there are many other possibilities, each with its own unique spectral qualities and correlation characteristics, and the described system is not limited to those options listed above.

Introducing an uncorrelated phase rotation polarity pattern to the phase transitions achieves two objectives. First, in the receiver, when the waveform is correlated with the reference code, deep nulls will still be achieved on each side of the primary lobe. Thus, the receiver's time and position accuracy will not be affected by the modified waveform. Second, the type of random phase pattern used will affect the power spectrum and can be used to advantage.

Note that in the case where a receiver is required to perform a correlation to acquire the spreading code of a spread spectrum signal (e.g., in CDMA to determine the identity of the user), the value of R should be small relative to the number of chips in the correlation.

Phase Trajectory with Greater Degrees of Freedom in Waveform Design

In the described system, the discontinuous phase transitions of the antipodal (BPSK), QPSK or other M-ary signal are replaced by a smoothed continuous trajectory, which enables a system designer to choose the most optimal phase trajectory function and phase polarity pattern to fit the particular application requirements for correlation loss and spectral content.

One possibility is to obtain the phase as the integral of Gaussian filtered frequency pulses of width $T_p$, where the overall symbol time is $T_s$, and the ratio $(T_p/T_s)$ and the Gaussian filter bandwidth is B form two parameters of the phase trajectory optimization space.

There many other possible phase trajectory functions that can be used with the phase rotation pattern aspect of this invention, each with their own unique spectral and correlation parameters. These can be the integral of filtered frequency pulses where the filter transfer function $H(\theta)$ is non-Gaussian. For example, a linear, a raised cosine, Bessel, butterworth, chebychev, elliptical, arbitrary digital FIR, or IIR filters could be used to filter the frequency pulses.

There are other arbitrary trajectory functions that are not even expressed in terms of an integral of a filtered frequency pulse, but rather by defining the continuous phase trajectory directly. There are a large number of possible trajectory functions, but an optimal trajectory can be found using the methodology described below.

The phase trajectory can be tailored to the particular transmission channel over which the system operates. Modern waveform generators use digital signal processing methods, where N samples are used to represent each symbol phase trajectory. Each sample is represented by a K-bit word, and there are $2^{NK}$ possible trajectories. Using common values such as 8-bit words (K=8) and 6 samples per symbol (N=6) reveals that there is a large number of possible trajectories ($2^{48}$). However, the search space can be significantly narrowed using symmetry constraints, because the trajectory function of the last three samples will be a mirror or inverted version of the first three samples. Thus, in this example, the search space is actually $2^{24}$=1.7E+07 unique trajectory functions. This number is small enough that current computer simulation techniques can evaluate this number of possible trajectories in a reasonable amount of time and determine the optimal trajectory for the application based on the spectral constraints and correlation requirements. The actual number of possibilities can also be reduced by constraining the phase trajectory to be monotonically increasing or decreasing during each symbol transition. Further, methods of reducing the search space can be found and are beyond the scope of this application. Once the optimal phase trajectory has been found, it can be stored in a look up table to be used in real time for the waveform generation using a digital signal processor (DSP) or field programmable gate array (FPGA).

First Example Implementation

Figure 6:
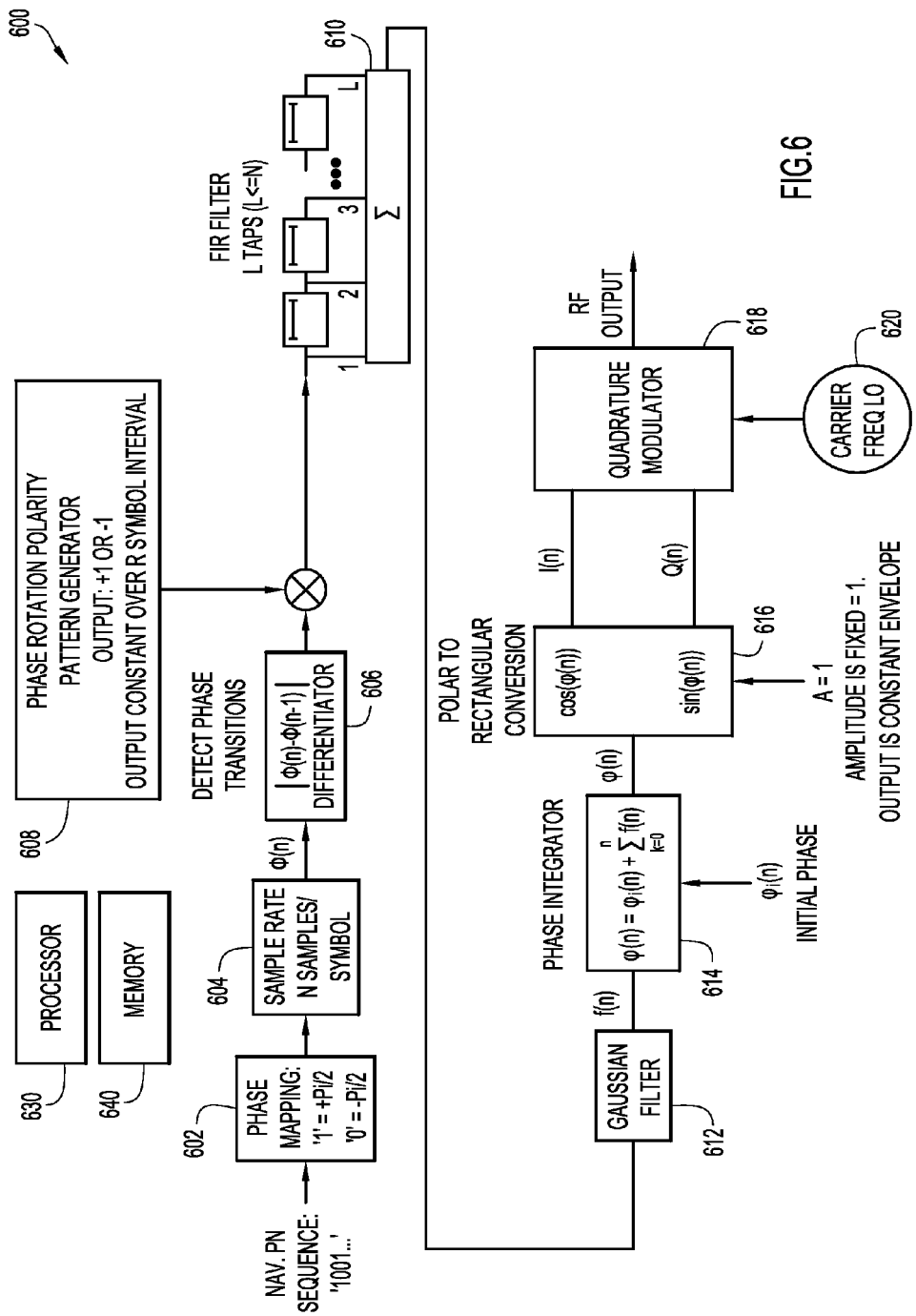
FIG. 6 is a block diagram of an example modulation system capable of generating phase transition patterns that are uncorrelated with the sequence of symbol states (symbol sequence) of the transmit signal and that have continuous phase transition trajectories.

FIG. 6 is a block diagram illustrating the components of an example implementation of an RF modulation system 600 capable of generating an antipodal (e.g., BPSK) transmit signal having a phase transition pattern that is uncorrelated with the symbol sequence (e.g., a PN code) of the transmit signal and having continuous phase transition trajectories. In this example, the underlying transmit signal is a navigation signal having a PN symbol sequence; however, the invention is not limited to navigation signals and is applicable to other suitable signal types.

Each of the various components shown in FIG. 6 essentially performs certain operations for generating the transmit signal, and individual components can be implemented in hardware, software, or a combination of hardware and software, as appropriate. For example, modulation system 600 includes a processing capability generally represented by a processor 630, which can include, for example, one or more microprocessors, microcontrollers, or digital signal processors capable of executing program instructions (i.e., software) for carrying out at least some of the various operations and tasks to be performed by modulation system 600.

Modulation system 600 further includes one or more memory or storage devices represented by memory module 640 to store a variety of data and software instructions (control logic) for execution by processor 630. Memory 330 may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, memory 640 comprises one or more tangible (non-transitory) processor-readable or computer-readable storage media that stores or is encoded with instructions (e.g., control logic/software) that, when executed by processor 630, cause processor 630 to perform the operations described herein. Memory 640 may also store various other data and information necessary for operation of modulation system 600.

While processor 630 and memory 640 suggest a processing environment comprising a data or signal processor that executes software stored in a memory, one or more of the components of modulation system 600 shown in FIG. 6 can be implemented in hardware as a fixed data or signal processing element, such as an application specific integrated circuit (ASIC) that is configured, through fixed hardware logic, to perform certain functions. Yet another possible processing environment is one involving one or more field programmable logic devices (e.g., FPGAs), or a combination of fixed processing elements and programmable logic devices.

Referring again to FIG. 6, a phase mapper 602 phase maps an input navigation PN symbol sequence by assigning specific phases to the logical zeros and ones of the input sequence. For example, each logical '1' in the PN symbol sequence can be mapped to the phase $\pi/2$ radians (90°), while each logical '0' can be mapped to the phase $-\pi/2$ radians (−90°). The phase-mapped PN symbol sequence is digitally sampled at a rate of N samples per symbol by a digital sampler 604, resulting in an output sequence of phases $\phi(n)$. A phase differentiator 606 differentiates the samples by comparing successive samples $(\phi(n)-\phi(n-1))$ to detect samples where phase transitions occur. The output of phase differentiator 606 is a magnitude indicating the size of the phase step. This output generates a positive, pulse-like signal at the symbol boundary between symbols of different values (i.e., when a '0' is followed by a '1' or vice versa). For a phase transition in a BPSK signal, the phase step is ±π. The magnitude of the phase step in this example is π and is unsigned.

Next, the phase transition steps generated by the magnitude of the differentiator 606 are multiplied by the output of a phase rotation polarity pattern generator 608 to randomize or patternize the direction of phase rotation from one antipodal symbol to another around the unit circle. The pattern generator 608 generates a phase rotation polarity signal having a value of +1 or −1 in accordance with the phase transition polarity pattern being deployed. The phase transition polarity pattern can be a random, pseudo-random, or predetermined fixed sequence, and the sequence parameters can be chosen to achieve desired spectral and correlation properties. Various options for generating uncorrelated patterns are listed above. As previously described, each phase rotation polarity signal in the pattern sequence is applied to the sampled PN signal over a span of R symbols (i.e., the output of pattern generator 608 is constant over an R-symbol interval). Multiplying the phase transition steps generated by the magnitude of the differentiator 606 by the phase rotation polarity signal preserves the time of the transitions within the PN sequence but sets the transition polarity based on the pattern.

Figure 4:
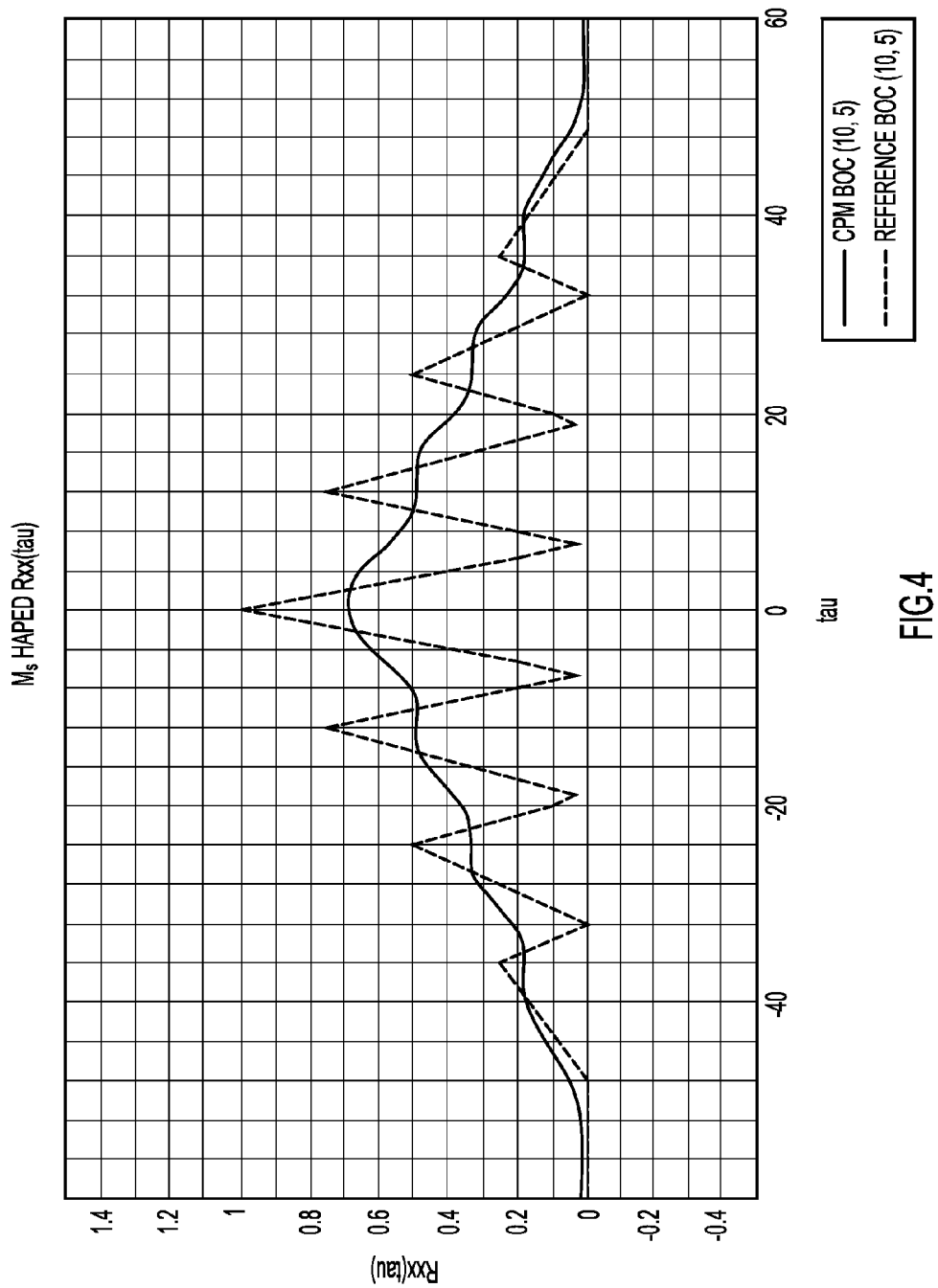
FIG. 4 is a graph illustrating correlation function degradation resulting from the fixed phase rotation polarity of FIG. 2 in a continuous phase modulation (CPM) signal relative to a reference BPSK waveform.
Figure 5:
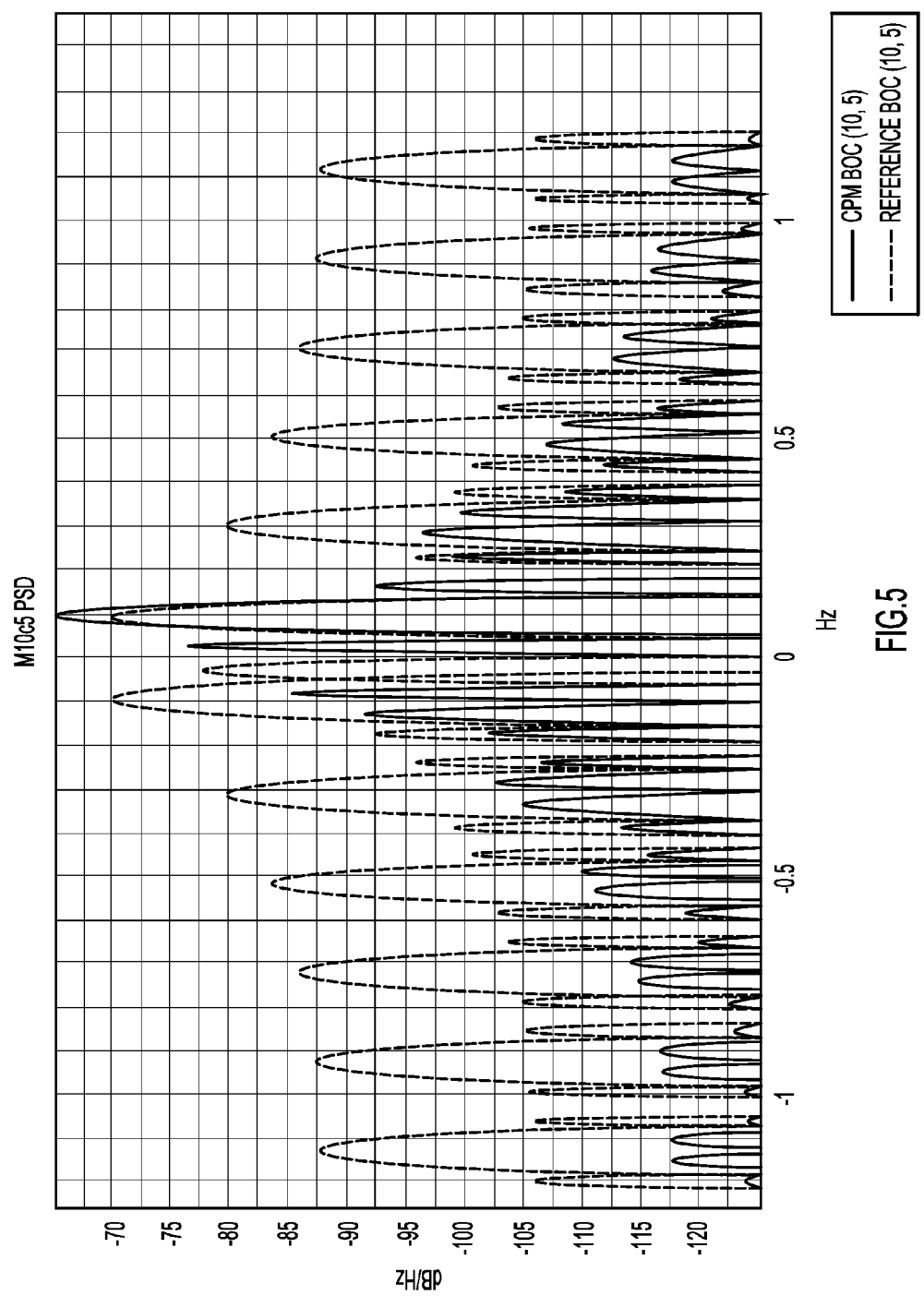
FIG. 5 is a graph illustrating the change in the power spectrum resulting from the fixed phase rotation polarity of FIG. 2 in a continuous phase modulation (CPM) signal relative to a reference BPSK waveform.

As long as the sequence of the antipodal symbols match the input reference PN (navigational or other timing) code sequence, it does not matter to the user receiver whether the waveform took the clockwise (negative phase step) or counter clockwise (positive phase step) trajectory around the unit circle to get from one symbol to another. However, if the transitions always go in the same direction, there will be a distortion in the cross-correlation function in the receiver, as shown in FIG. 4. This distortion occurs because the receiver uses a non-coherent complex correlator and sees both the I and Q quadrature components of the signal. If the waveform always transitions in the same direction then there will be a spillover from one symbol into the next which will cause correlation between adjacent symbols. This will be evident in the resulting cross-correlation in the receiver in that the adjacent side nulls will partially fill in and the center lobe will be wider. For a navigational system, this effect reduces the time and position accuracy.

Referring once again to FIG. 6, an FIR filter 610 having L taps, where L is less than or equal to the total number of samples N in a symbol, can be used to repeat the phase transition samples L times such that, for each phase transition, the first L out of the total of N samples in the symbol are used for the phase transition trajectory. By way of a non-limiting example, each of the L taps of FIR filter 610 can have a coefficient=1. According to another approach, FIR filter 610 can have N taps and have the first L coefficients=1, while the remaining L-N coefficients are set to zero. The purpose of the FIR filter is to control the fraction of the symbols (L/N) during which the phase is in transition. For example, if there are 12 samples per symbol (N=12) and L=6, then during the first half of the symbol the phase can be transitioning while during the second half (the last 6 samples), the phase is relatively constant. Note that conventional MSK (linear ramp phase transition) and GMSK (Gaussian phase transition) continuous phase modulation techniques have the phase transition occurring over the entire symbol interval (i.e., L=N). In the above described technique, the portion of the symbol interval over which the phase transition occurs can be controlled by setting the value of L to less than or equal to N. The number of non-zero-coefficient taps L (and consequently the ratio L/N) and the Gaussian filter bandwidth B both affect the resulting spectrum and correlation function of the output signal and can be chosen to achieve the desired spectral and correlation properties for a particular application. If L is a relatively small number (e.g., closer to 0 than N), then the phase transition between adjacent symbols is relatively short and the resulting modulation tends to have correlation and spectral properties more like that of a signal with instantaneous phase transitions. If L is a relative large number (e.g., closer to N than 0), then the phase transition between adjacent symbols is relatively long, and the spectral characteristic of the signal are more like that of a typical CPM signal (though the correlation function, while suffering some correlation loss, may nevertheless maintain deep nulls like the instantaneous phase transition signal due to the phase rotation polarity pattern described herein).

For each phase transition, the output of FIR filter 610 is essentially a set of L time-domain samples. A Gaussian digital filter 612 for shaping the frequency samples applies a transfer function h(n) to the L repeated samples to produce an instantaneous frequency output signal ƒ(n). By way of a non-limiting example, the Gaussian filter can apply the following transfer function:

$$h(n) = \sqrt{\frac{2\pi}{\ln 2}} B e^{\left(\frac{-2\pi^2 B^2 (nT_s)^2}{\ln 2}\right)}$$

where B is the bandwidth of the filter. The filter bandwidth B can be chosen to provide the desired output spectrum and correlation performance. However, a Gaussian filter may not be the optimal filter for a given application, and another low pass filter that suitably shapes the frequency samples can be used. Furthermore, a suitable filter transfer function can be used to compensate for the nonlinear RF power amplifier characteristics and characteristics of downstream filters. The frequency pulse shape can be optimized to comply with the transmitter spectral requirements while providing the lowest correlation loss and deepest nulls in the cross-correlation function in the user receiver front-end bandwidth, and/or highest possible RF signal level in the receiver bandwidth. The output of Gaussian filter 612 is essentially a sequence of L time-domain samples, smoothed in accordance with the Gaussian filter response, which serve as an instantaneous frequency signal ƒ(n) that, when integrated, forms the desired phase transition trajectory.

The instantaneous frequency signal ƒ(n) is supplied to a phase integrator 614 that integrates the frequency signal according to:

$$\varphi(n) = \varphi_i + \sum_{k=0}^{n} f(k)$$

where $\varphi_i$ is the initial phase, to produce a cumulative phase trajectory signal φ(n) that provides a smooth phase step between adjacent symbols having different values.

The cumulative phase trajectory signal φ(n) is supplied to a constant amplitude polar-to-rectangular converter 616, which computes the constant envelope I(n) and Q(n) waveforms as the cosine and sine of the phase trajectory signal and passes them as inputs to a quadrature modulator 618. Quadrature modulator 618 is supplied with the transmit carrier frequency via a local oscillator 620 and generates as its output the desired continuous phase RF signal for transmission.

As will be appreciated from the foregoing description, a variety of implementations are possible by selecting certain parameters such as: the number L of samples per symbol used to perform the phase transition; the shape of the phase trajectory (e.g., Gaussian, linear, etc.); and the phase rotation polarity pattern. For example, a full MSK version of the waveform can be generated by using all of the samples in a symbol (L=N), without filtering and integrating to yield a linear phase transition, whereby the phase is linearly ramped during the entire symbol interval. According to another example, a partial MSK version of the waveform can be generated by using only a fraction of the samples in a symbol (L<N) for a linear phase transition, with the phase being constant for the remainder of the symbol. According to yet another example, a full GMSK version of the waveform can be generated by using all of the samples of a symbol (L=N), wherein the phase follows an integrated-Gaussian trajectory during the entire symbol interval. A partial GMSK version can be achieved by using only a fraction of the samples in a symbol (L<N) for the phase transition, with the phase being constant over the remaining portion of the symbol. Phase trajectories other than linear and Gaussian can also be used. In each of these examples, the polarity of the phase transition is determined according to the phase rotation polarity pattern generator as previously described.

Figure 7A:
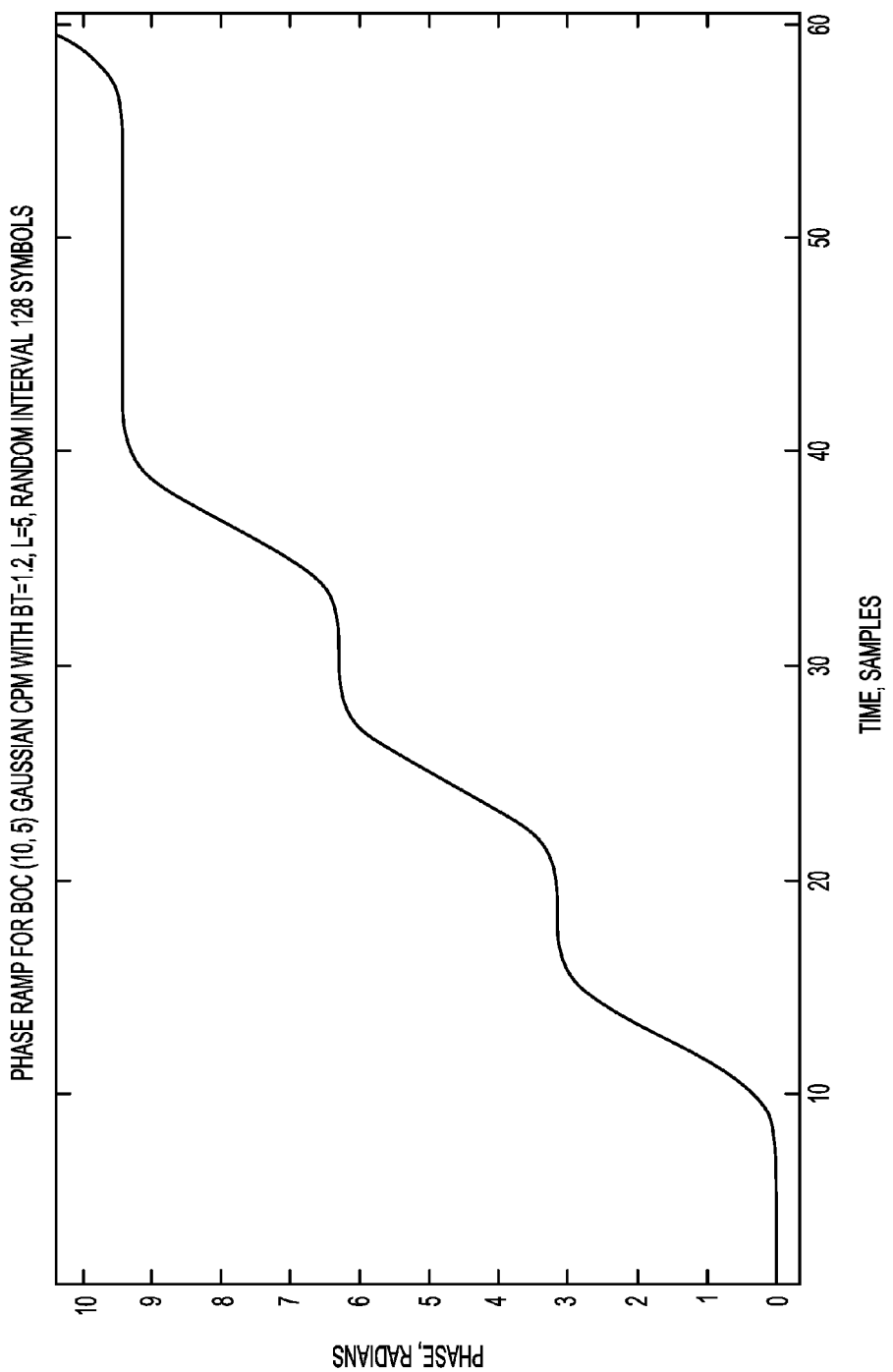
FIG. 7A is a time-domain graph illustrating an example phase trajectory having a series of positive rotation phase transitions between antipodal states over several symbols for Gaussian filtering of a CPM BOC(10,5) waveform.

FIG. 7A is a time-domain graph illustrating the output phase trajectory $\phi(n)$ of an example phase integrator over a span of about 60 samples (about five symbols). In this example, the shape of the phase trajectory reflects a Gaussian filter, because a Gaussian CPM BOC(10,5) is used, where BT=1.2 and L=5. In this example, the number of samples per symbol (N) is 12, such that L/N=5/12. This means that for $5/12^{ths}$ of the symbol, the phase is transitioning and, for the remaining $7/12^{ths}$ of the symbol, the phase is constant. Other filters would produce a different phase trajectory. Note that the phase rotation polarity pattern generator keeps its output (+1 or −1) constant over each R-symbol interval (i.e., within any given R-symbol interval, the phase transitions are either all positive or all negative). In the example shown in FIG. 7A, because the number of symbols depicted is far fewer than R, all of the phase rotation transitions have the same polarity in this interval, in this case, a positive phase ramp.

Figure 7B:
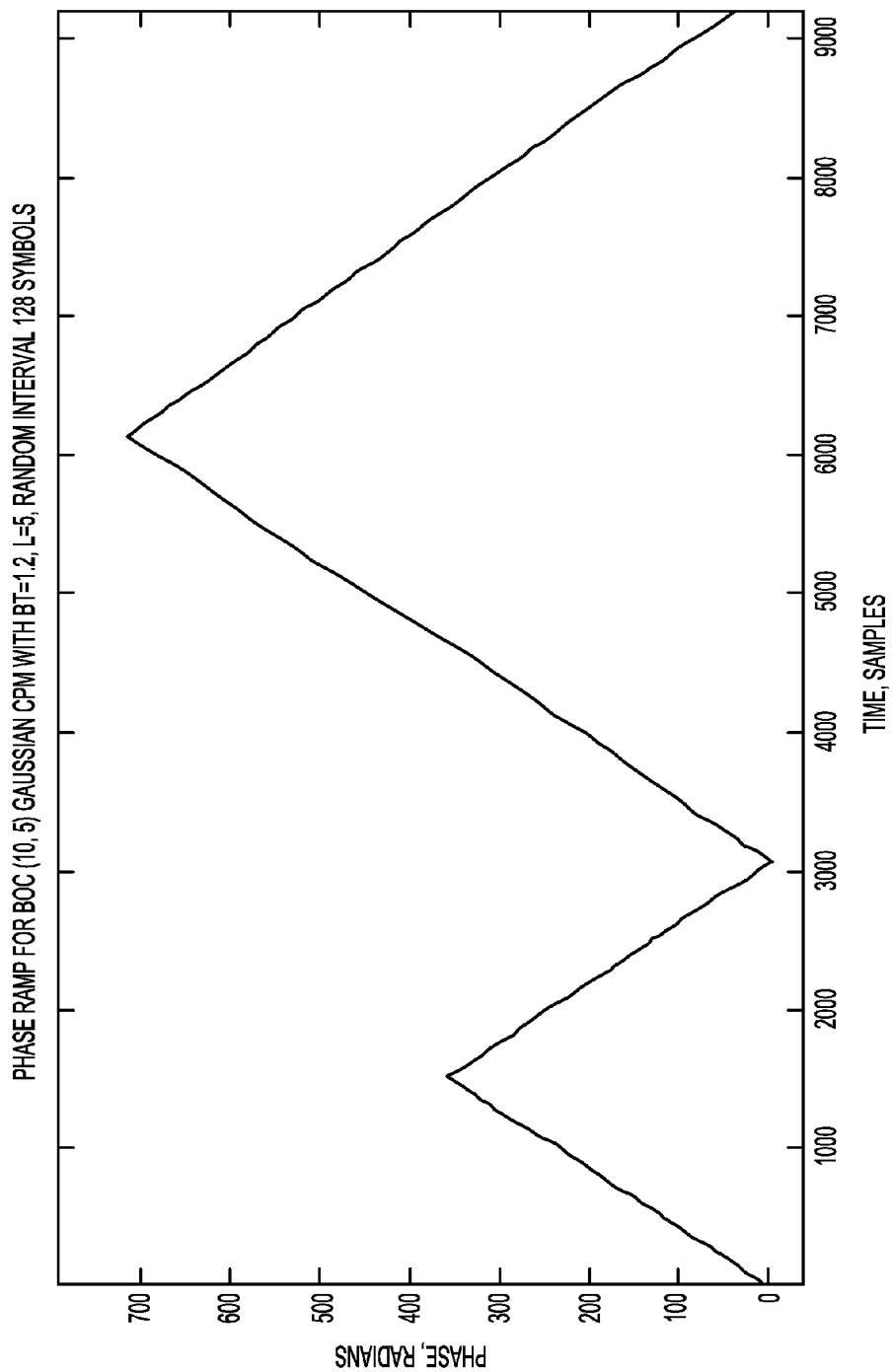
FIG. 7B is a time-domain graph illustrating the same phase trajectory as FIG. 7A over several R-symbol intervals in the phase rotation polarity pattern, where the phase rotation polarity is constant (either positive or negative) within each R-symbol interval.

FIG. 7B is a time-domain graph of the same output signal shown in FIG. 7A (a Gaussian CPM BOC(10,5), BT=1.2, L=5, N=12) but "zoomed out" to show several intervals in the phase rotation polarity pattern, in this case spanning about 9000 samples (note that FIG. 7A shows a much smaller span of about 60 samples). From the left side of the graph, the phase rotation polarity is positive (+1) over the first R-symbol interval, followed by a second R-symbol interval in which the phase rotation polarity is negative (−1). In this example, R=128. The third and fourth R-symbol intervals have a positive (+1) phase rotation polarity, followed by fifth and sixth R-symbol intervals in which the phase rotation polarity is again negative (−1). Thus, in this example, the phase rotation polarity pattern sequence shown is: +, −, +, +, −, −. Considering, for example, the first R-symbol interval shown, while the graph appears to be a substantially straight line extending from 0 to about 360 radians over about 1500 samples, in fact, if one were to "zoom in" to look at a segment of this "line" it would actually look like the curve shown in FIG. 7A, reflecting the Gaussian phase trajectory.

Figure 7C:
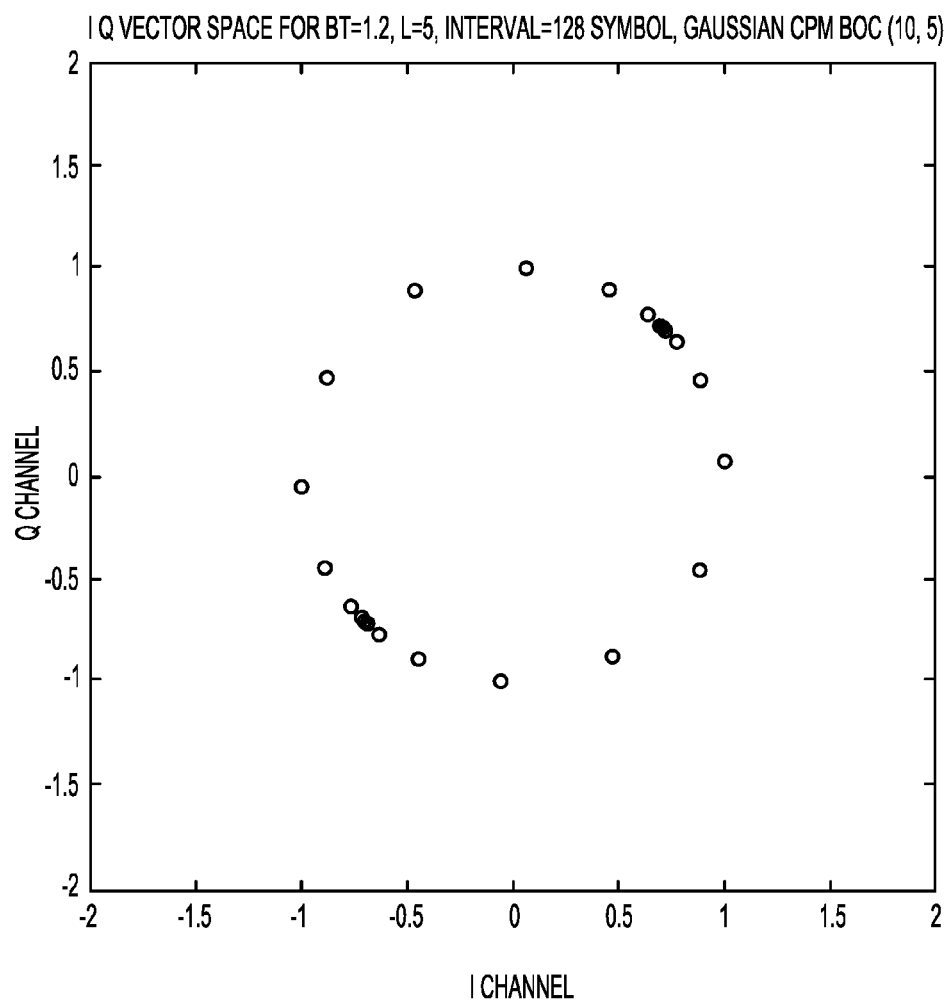
FIG. 7C is a signal vector scatterplot diagram for the same waveform shown in FIGS. 7A and 7B.

FIG. 7C is a signal vector scatterplot diagram for the same waveform shown in FIGS. 7A and 7B (a Gaussian CPM BOC(10,5), BT=1.2, L=5, N=12). In this example, the two antipodal phase states are located at 45° and 225°. The scatterplot shows groupings of phase states dwelling around the two antipodal phase states and six sample phase transitions between the two phase states, which essentially trace out the Gaussian phase trajectory.

Figure 7D:
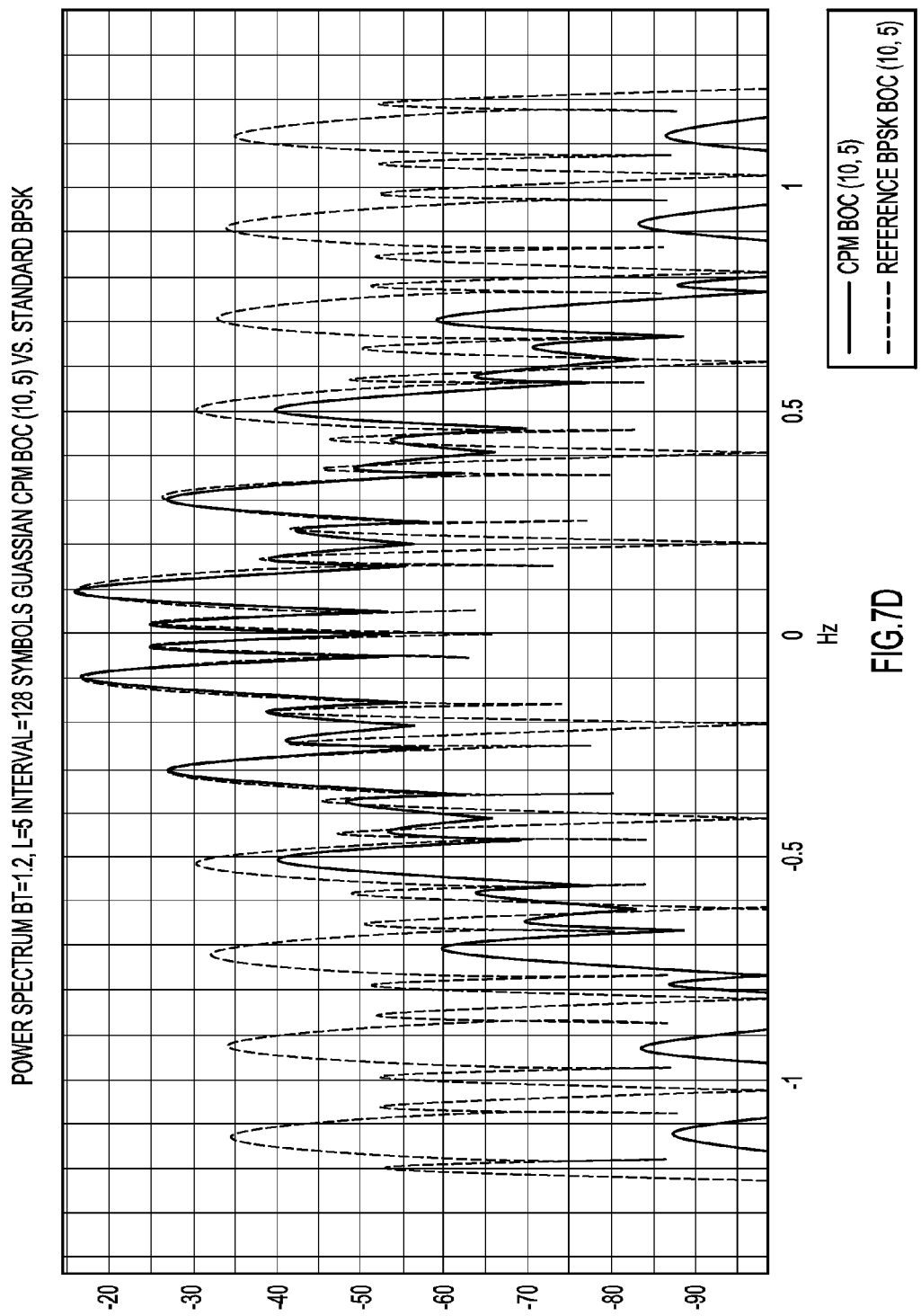
FIG. 7D is a frequency-domain graph illustrating the power spectrum of the waveform of FIGS. 7A-7C compared with a reference binary phase shift keying (BPSK) BOC(10, 5) waveform.

FIG. 7D is a frequency-domain graph of the power spectrum of the waveform of FIGS. 7A-7C compared with a reference binary phase shift keying (BPSK) BOC(10,5) waveform with instantaneous phase transitions. Note that power spectrum of the waveform has significantly lower sidelobes (i.e., faster rolloff of sidelobes) than the reference BPSK waveform, similar to a conventional CPM waveform such as GMSK, since smoother phase transitions reduce the higher frequency components of the waveform. However, unlike conventional CPM waveforms, which transition the phase continuously over the entire symbol period, the scheme described herein allows the designer to control the shape and rolloff of the sidelobes by choosing the values of L (the number of samples over which the phase transition occurs) and B.

Figure 7E:
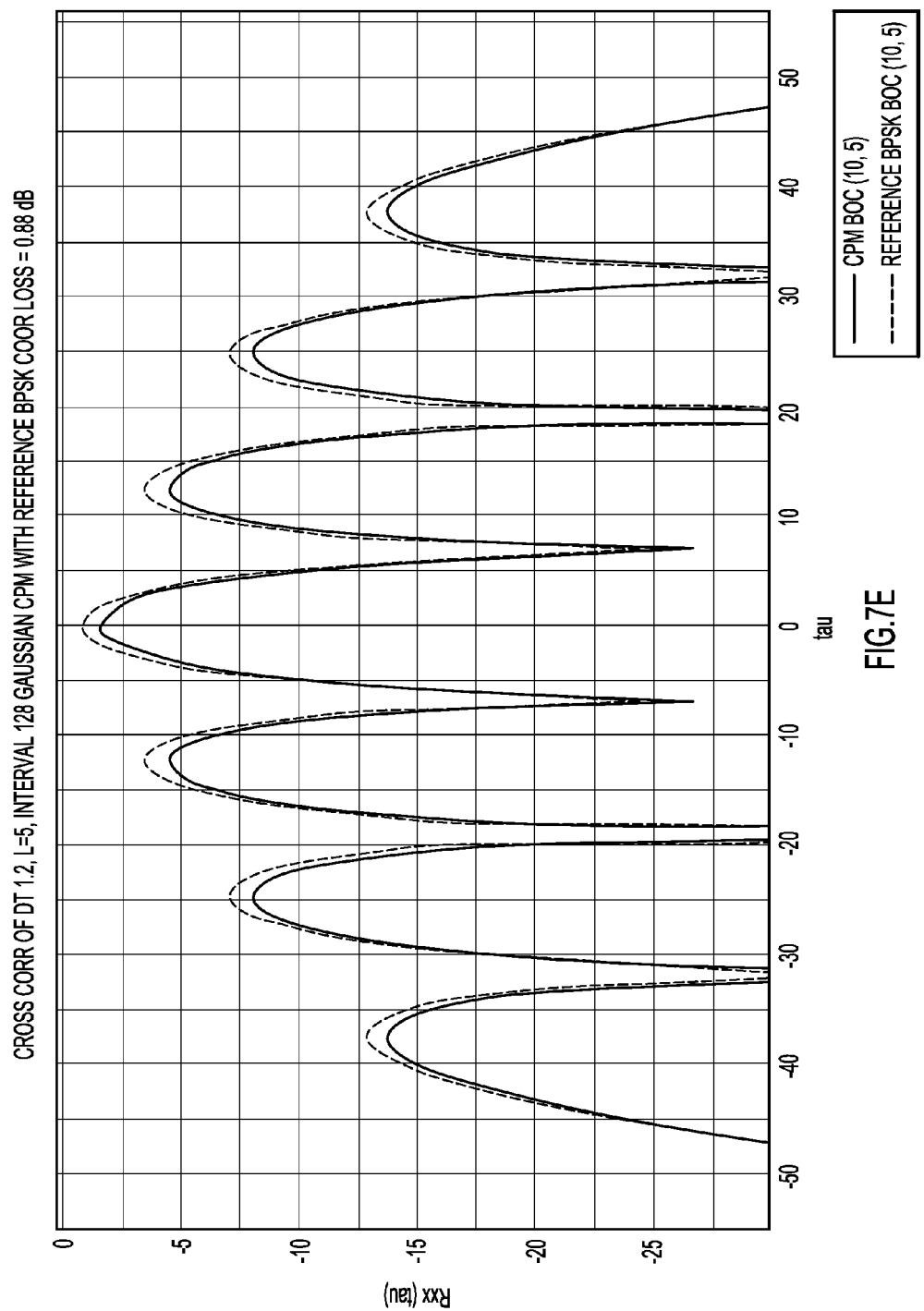
FIG. 7E is a graph illustrating the cross correlation of the waveform of FIGS. 7A-7D compared with the reference BPSK BOC(10,5) waveform.

FIG. 7E is a graph illustrating the cross correlation of the waveform of FIGS. 7A-7D compared to the reference BPSK BOC(10,5) waveform. Notably, the steep nulls are preserved in the Gaussian CPM BOC(10,5) waveform as a result of the phase rotation polarity pattern of the phase transitions being uncorrelated with the PN code of the signal. The preservation of the deep nulls in the cross correlation is a significant difference between this waveform and a conventional CPM waveform (see FIG. 4) owing to the phase rotation polarity pattern being uncorrelated with the symbol sequence (e.g., the PN code of the transmit signal). The peak of the cross-correlation curve of the Gaussian CPM BOC(10,5) waveform is somewhat lower than that of the reference BPSK waveform as a result of correlation loss owing to the continuous phase transitions.

Figure 7F:
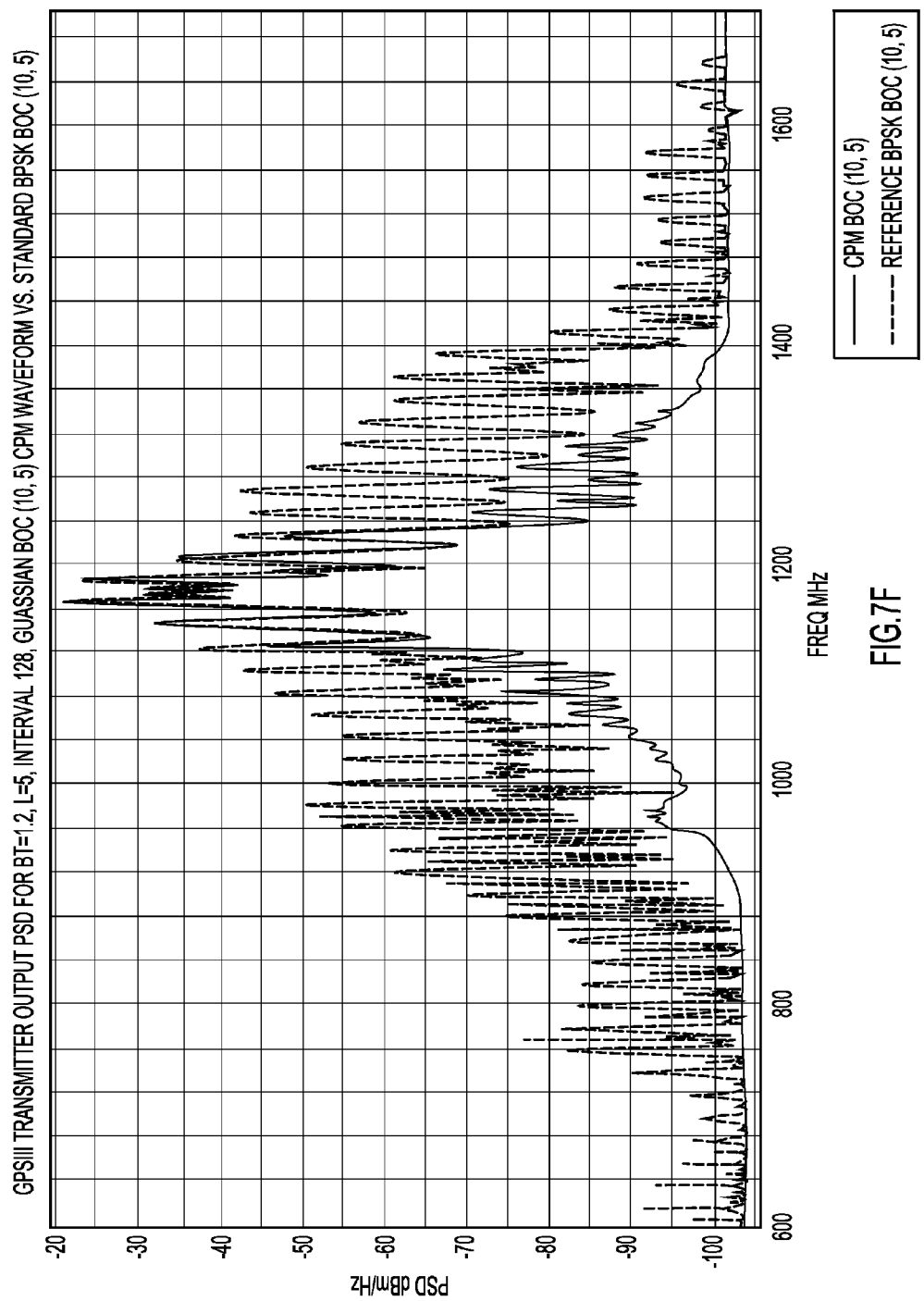
FIG. 7F is a frequency domain graph illustrating the output spectrum of a saturated high power RF amplifier using the waveform of FIGS. 7A-7E compared with the reference BPSK BOC(10,5).

FIG. 7F is a frequency domain graph illustrating the output spectrum of a saturated high power RF amplifier using the waveform of FIGS. 7A-7E (Gaussian CPM BOC (10,5)) compared with the reference BPSK BOC(10,5). Note that the reduced spectrum is preserved in the constant envelope signal at the output of the non-linear RF amplifier. This result shows that a bandwidth efficient waveform has been achieved at the output of the power amplifier.

Extension to M-Ary Modulation

While the foregoing description focuses on antipodal modulation schemes in which the two possible phase states are 180° out of phase, the described techniques can be extended to phase modulation schemes involving M-ary phase constellations. This context is important because multiple navigational codes can be combined on I and Q channels to form a composite waveform having M possible phases. Some examples of M-ary constellation transmission of time acquisition codes are:

1. Sending one code on each quadrature;
2. Using majority vote to combine two or more codes on each quadrature;
3. Interplex combining; and
4. POCET combining.

The described system is extended to these M-ary waveform cases to provide a reduced spectral occupancy and desired correlation performance. More specifically, when there is a phase transition in a continuous phase modulation waveform, the signal vector transitions between the M phases of the constellation by moving along the unit circle to provide a constant envelope waveform. As previously described, a fraction (L/N) of the samples of a symbol, where L≤N, can be used to effect the phase transition between adjacent symbols. The phase trajectory function can be linear, integrated Gaussian, or other smoothed function, as in the antipodal case, to provide desired spectral and correlation properties. Even with an M-ary constellation, there are instances where the phase transition between adjacent symbols requires a 180° phase transition. For example, suppose a QPSK waveform uses a constellation of four phases at 45°, 135°, 225°, and 315° to represent the logical values 00, 01, 11, 10, respectively. In this case, if adjacent symbols represent the values 00 and 11 or if adjacent symbols represent the values 10 and 01, a 180° phase transition is required. According to the described system, in an M-ary waveform, when the phase transition between two adjacent symbols is 180°, the previously described phase rotation polarity pattern can be employed to determine the direction of the 180° phase transition, as in the antipodal case.

The example implementation shown in FIG. 6 in the context of an antipodal waveform can be extended to M-ary modulation as follows. After mapping the input sequence to the M-ary phase constellation and sampling the signal at N samples per symbol, the phase transition position, polarity, and magnitude of each phase transition are found by differentiating the samples. Note that the magnitude of the phase transitions must be determined to be able to differentiate between phase transitions of 180° and smaller phase transitions. Phase transitions that are determined to be less than 180° are passed to the FIR filter 610 unchanged (i.e., no phase rotation polarity modification is made). For phase transitions that are 180°, the output of the phase rotation polarity pattern generator are applied to the output of the differentiator 606 as previously described to modify the phase rotation polarity and thereby ensure that the 180° phase rotations are uncorrelated with the PN code of the signal. The remaining processing is the same as previously described in the antipodal case.

Second Example Implementation

Figure 8:
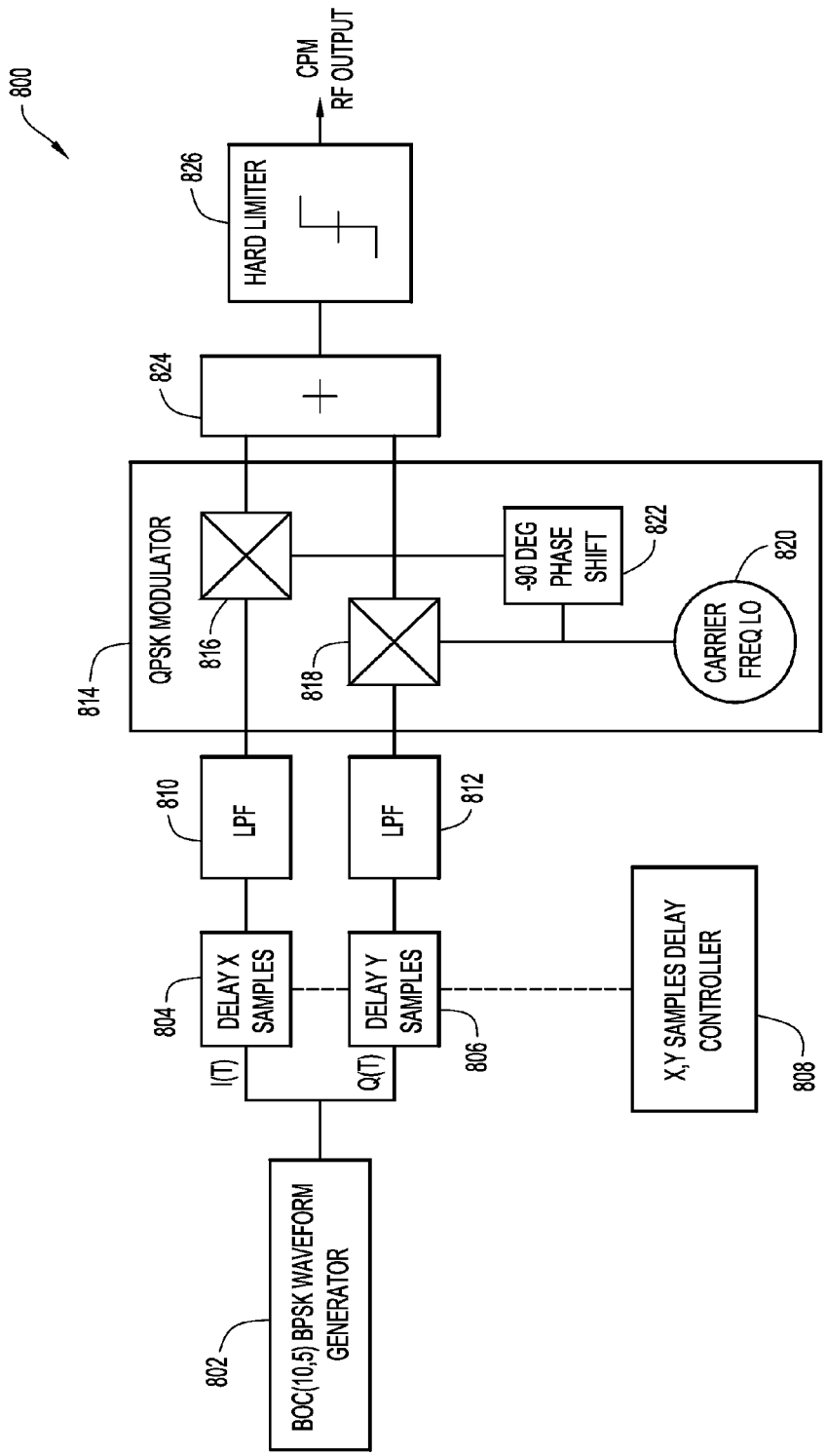
FIG. 8 is a block diagram of another implementation of a modulation system capable of generating phase transition patterns that are uncorrelated with the symbol sequence of the transmit signal and that have continuous phase transition trajectories.

FIG. 8 is a block diagram illustrating components of another example implementation of a modulator system 800 capable of generating an antipodal (e.g., BPSK) transmit signal having continuous phase transition trajectories wherein the phase rotation polarity pattern is uncorrelated with the symbol sequence (e.g., PN code) of the transmit signal. Compared to the first example implementation shown in FIG. 6, the implementation shown in FIG. 8 relies more heavily on hardware than digital signal processing to apply the phase rotation polarity pattern and to produce the transmit signal.

In the example shown in FIG. 8, a waveform generator 802 generates a digital baseband time-domain sample stream representing a BPSK BOC(10,5) waveform, which is split and supplied both to an I-channel (I(t)) and to a Q-channel (Q(t)). The sample stream I(t) is supplied to an I-channel delay device 804 ("delay X samples"), and the sample stream Q(t) is supplied to a Q-channel delay device 806 ("delay Y samples"). An X, Y Samples Delay Controller 808 controls delay devices 804 and 806 to selectively delay either the I(t) or Q(t) signal by L samples. The decision of whether the I(t) or Q(t) signal is delayed is determined by the output of the delay controller 808. The selection of delaying I(t) or Q(t) is equivalent to selecting a positive or negative phase rotation at the downstream hard limiter output. Thus, in this implementation, the delay controller 808 essentially operates as the phase rotation polarity pattern generator by selectively applying delays to the I and Q channel signals to create a phase rotation polarity pattern that is uncorrelated with the symbol sequence of the waveform, e.g., using one of the patterns previously described. In effect, this implementation provides a different way of generating a CPM waveform while "patternizing" the polarity of the 180° phase transitions.

After selective application of a delay to the signals I(t) and Q(t), the resulting I and Q signals are then filtered by respective low pass filters 810 and 812 to produce filtered baseband I and Q signals, and then supplied to a quadrature phase shift keying (QPSK) modulator 814. QPSK modulator 814 includes an I-channel mixer 816 that mixes the filtered baseband I signal with a carrier frequency signal supplied by a local oscillator 820, which has been phase shifted by −90° relative to the Q-channel by a phase shifter 822, to produce a carrier-frequency I-channel signal. QPSK modulator 814 further includes a Q-channel mixer 818 that mixes the filtered baseband Q signal with the carrier frequency signal supplied by local oscillator 820 to produce a carrier-frequency Q-channel signal.

A combiner 824 combines the carrier frequency I-channel and Q-channel signals, and the output of combiner 824 is hard limited by a hard limiter 826 (e.g., a saturated amplifier) at low power. Alternatively, the carrier frequency I and Q signals can be hard limited in DSP processing by first converting the I and Q signals from rectangular to polar format, then fixing the amplitude to be constant, and then converting back to a rectangular (I and Q) format. The resulting constant envelope waveform preserves the phase information of the signal and can be fed as the input to a saturated amplifier such as a travelling wave tube or a solid state amplifier. Because the waveform has a constant envelope, the spectral regrowth through the saturated amplifier is minimized.

The parameters of the low pass filters 810 and 812 can be optimized to provide the best bandwidth efficiency and correlation performance tradeoff. These include the filter characteristic function and bandwidth. By way of non-limiting examples, analog, digital FIR, or digital IIR filters can be used.

As with the first example implementation, the second example implementation can be extended to apply to M-ary modulation schemes. In particular, the waveform generator 802 of FIG. 8 generates a baseband M-ary waveform and, when a phase transition of 180° occurs, the sample delay controller 808 delays either the I or Q signal by L samples in accordance with the phase rotation polarity pattern, as previously described. For phase transitions less than 180°, sample delay controller 808 does not apply any delay to the I and Q signals, and the processing otherwise remains essentially the same.

The described techniques for generating a bandwidth efficient continuous phase modulation signal are particularly useful navigational systems that employ navigational and time acquisition codes. Such navigational systems include satellite systems such as GPS, GNSS, etc.; terrestrial or airborne platform wireless navigational systems; time acquisition for wireless communication systems; time acquisition for fiber optic channels; and navigational and time acquisition systems based on sonar, ultrasound, or optical channels. As previously described, by ensuring that the phase rotation polarities are uncorrelated with the underlying symbol sequence code of the signal, the degradation in the autocorrelation nulls that would otherwise result from continuous phase modulation are avoided, allowing highly accurate signal timing determination like that achievable with instantaneous phase transitions but with the more efficient spectral bandwidth of a continuous phase modulation signal. By judicious selection of the phase trajectory parameters, and the phase rotation polarity pattern, the system designer has much greater flexibility in designing a waveform with optimal spectral and correlation properties for a particular application.

The described techniques are also useful in the context of communication systems to control the shape of the transmit signal spectrum. For example, in a GMSK system, the shape of the signal spectrum can be skewed toward the positive or negative frequency direction by selectively controlling the polarity of the phase rotation during phase transitions (e.g., to avoid certain frequencies), and the polarity pattern can be used to eliminate clocking spurs that might otherwise exist in the GMSK signal. Further, communication systems that rely on acquisition of a preamble containing a PN sequence in order to acquire the timing and phase of a signal or to determine channel characteristics would benefit from the described technique due to the improved correlation performance.

Having described example embodiments of a system and methods for bandwidth efficient continuous phase modulation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for generating a phase modulated, constant envelope transmit signal having continuous phase transitions between adjacent symbols representing different states, comprising:
    generating a stream of symbols having a sequence of symbol states;
    identifying antipodal phase transitions between adjacent symbols representing different states;
    controlling a phase rotation polarity of the continuous phase transitions between adjacent symbols having antipodal phase transitions such that a phase rotation polarity pattern of the antipodal phase transitions in the stream of symbols is uncorrelated with the sequence of symbol states; and
    generating the constant envelope transmit signal from the stream of symbol states.

2. The method of claim 1, wherein the phase rotation polarity pattern comprises a sequence of positive phase rotation intervals in which antipodal phase transitions are rotated positively and negative phase rotation intervals in which antipodal phase transitions are rotated negatively, the sequence of positive and negative phase rotation intervals being uncorrelated with the sequence of symbol states.

3. The method of claim 2, wherein the positive and negative phase rotation intervals span R symbols, where R is an integer greater than one.

4. The method of claim 3, wherein a value of R is variable over time.

5. The method of claim 2, wherein the sequence of positive and negative phase rotation intervals is a pseudo-noise (PN) sequence of positive phase rotation intervals and negative phase rotation intervals that are applied to the antipodal phase transitions.

6. The method of claim 2, wherein a probability of a positive phase rotation interval is different from a probability of a negative phase rotation interval in the phase rotation polarity pattern.

7. The method of claim 2, wherein the phase rotation polarity pattern comprises a fixed sequence of positive phase rotations intervals and negative phase rotation intervals that are applied to the antipodal phase transitions.

8. The method of claim 7, wherein the fixed sequence alternates between positive phase rotation intervals and negative phase rotation intervals.

9. The method of claim 1, wherein a phase trajectory of the continuous phase transitions extends over an entire symbol.

10. The method of claim 1, wherein a phase trajectory of the continuous phase transitions extends over only part of a symbol.

11. The method of claim 1, wherein each of the symbols in the stream of symbols comprises a plurality of N samples, and a phase trajectory of the continuous phase transitions extends over L samples, wherein L is less than or equal to N.

12. The method of claim 1, wherein the continuous phase transitions have a Gaussian phase trajectory.

13. The method of claim 1, wherein the continuous phase transitions have a linear phase trajectory.

14. The method of claim 1, wherein the phase modulated, constant envelope transmit signal has M phase states, where M is greater than two, such that only some of the phase transitions between adjacent symbols are antipodal phase transitions, wherein the phase rotation polarity of only the antipodal phase transitions are controlled by the phase rotation polarity pattern.

15. An apparatus for generating a phase modulated, constant envelope transmit signal having continuous phase transitions between adjacent symbols representing different states, comprising:
    a baseband signal generator to generate a stream of symbols having a sequence of symbol states, wherein at least some adjacent symbols representing different states have antipodal phase transitions therebetween;
    a phase rotation polarity pattern generator to control a phase rotation polarity of the continuous phase transitions between adjacent symbols having antipodal phase transitions such that a phase rotation polarity pattern of the antipodal phase transitions in the stream of symbols is uncorrelated with the sequence of symbol states; and
    an RF modulator to generate the constant envelope transmit signal from the stream of symbol states.

16. The apparatus of claim 15, wherein the phase rotation polarity pattern comprises a sequence of positive phase rotation intervals in which antipodal phase transitions are rotated positively and negative phase rotation intervals in which antipodal phase transitions are rotated negatively, the sequence of positive and negative phase rotation intervals being uncorrelated with the sequence of symbol states.

17. The apparatus of claim 16, wherein the sequence of positive and negative phase rotation intervals is a pseudo-noise (PN) sequence of positive phase rotation intervals and negative phase rotation intervals that are applied to the antipodal phase transitions.

18. The apparatus of claim 15, wherein each of the symbols in the stream of symbols comprises a plurality of N samples, and a phase trajectory of the continuous phase transitions extends over L samples, wherein L is less than or equal to N.

19. The apparatus of claim 18, wherein the continuous phase transitions have a Gaussian phase trajectory.

20. One or more non-transitory computer readable storage media having instructions encoded thereon that, when executed by a processor, cause the processor to:
- generating a stream of symbols having a sequence of symbol states for a phase modulated signal having continuous phase transitions between adjacent symbols representing different states;
- identifying antipodal phase transitions between adjacent symbols representing different states;
- controlling a phase rotation polarity of the continuous phase transitions between adjacent symbols having antipodal phase transitions such that a phase rotation polarity pattern of the antipodal phase transitions in the stream of symbols is uncorrelated with the sequence of symbol states; and
- controlling a modulator to generate a constant envelope transmit signal from the stream of symbol states.

\* \* \* \* \*